United States Patent
Martell et al.

(10) Patent No.: US 10,555,018 B2
(45) Date of Patent: Feb. 4, 2020

(54) SYSTEMS AND METHODS OF PROGRAMMATIC VIDEO CONTENT DISTRIBUTION

(71) Applicant: Martell Broadcasting Systems, Inc., Brooklyn, NY (US)

(72) Inventors: Carey Ray Martell, San Marcos, TX (US); Akim Angelo Anastopoulo, Charleston, SC (US)

(73) Assignee: Martell Broadcasting Systems, Inc., Brooklyn, NY (US)

( * ) Notice: Subject to any disclaimer, the term of this patent is extended or adjusted under 35 U.S.C. 154(b) by 0 days.

(21) Appl. No.: 15/887,940

(22) Filed: Feb. 2, 2018

(65) Prior Publication Data

US 2019/0246159 A1 Aug. 8, 2019

(51) Int. Cl.
| | |
|---|---|
| H04N 21/262 | (2011.01) |
| H04N 21/81 | (2011.01) |
| H04N 21/61 | (2011.01) |
| H04N 21/437 | (2011.01) |
| H04N 21/2187 | (2011.01) |
| H04N 21/2668 | (2011.01) |
| H04N 21/6437 | (2011.01) |
| H04N 21/442 | (2011.01) |
| H04N 21/2343 | (2011.01) |
| H04N 21/658 | (2011.01) |

(52) U.S. Cl.
CPC ... *H04N 21/26258* (2013.01); *H04N 21/2187* (2013.01); *H04N 21/2343* (2013.01); *H04N 21/2668* (2013.01); *H04N 21/437* (2013.01); *H04N 21/44204* (2013.01); *H04N 21/6125* (2013.01); *H04N 21/6437* (2013.01); *H04N 21/6581* (2013.01); *H04N 21/812* (2013.01)

(58) Field of Classification Search
CPC ..................... H04N 21/26258; H04N 21/2187
See application file for complete search history.

(56) References Cited

U.S. PATENT DOCUMENTS

| | | | | |
|---|---|---|---|---|
| 8,521,899 | B2 | 8/2013 | Narula | |
| 2009/0228920 | A1 | 9/2009 | Tom | |
| 2009/0249222 | A1* | 10/2009 | Schmidt | H04N 21/2368 715/751 |
| 2015/0067722 | A1* | 3/2015 | Bjordammen | H04N 21/2625 725/32 |
| 2015/0310894 | A1* | 10/2015 | Stieglitz | H04N 21/47217 386/241 |
| 2015/0365450 | A1* | 12/2015 | Gaunt | H04L 65/4084 709/231 |
| 2016/0261367 | A1* | 9/2016 | Lee | H03M 13/353 |

* cited by examiner

*Primary Examiner* — Olugbenga O Idowu
(74) *Attorney, Agent, or Firm* — Lynch LLP (57) ABSTRACT

A system for distributed content distribution is presented which enables and facilitates distributed content programming. According to the system, a list of content segments that make up an episode and episode metadata are distributed from server to client. The client uses the list of content segments and the episode metadata to present a streamlined viewing experience to the user, notwithstanding different locations, formats, encoding schemes, and packetization schemes of the content underlying the list of content segments.

13 Claims, 5 Drawing Sheets

SYSTEMS AND METHODS OF PROGRAMMATIC VIDEO CONTENT DISTRIBUTION

FIELD OF THE INVENTION

The field of the invention is networked audio/video content management and distribution.

BACKGROUND

The background description includes information that may be useful in understanding the present invention. It is not an admission that any of the information provided in this application is prior art or relevant to the presently claimed invention, or that any publication specifically or implicitly referenced is prior art.

Currently, large user- and publisher-generated content distribution systems use methods of advertising and distribution that operate in a demand-per-video system. Content distributors gather important advertising information on a per-video basis, and advertising costs are generally correlated directly with the number of views a single video obtains. This current internet-content-distribution paradigm presents limitations for many classes of advertisers. Local advertisers, for example, interested in advertising only in a limited geographic area, must effectively pay to compete for the space with national advertisers. Viewers are disadvantaged, too, because they may be forced to interact with the system to choose content too frequently. And content creators are also disadvantaged because the per-video advertisement system makes short videos economically impossible to create. Few viewers want to watch a thirty-second advertisement before a two-minute video.

Traditional cable distribution systems package content into channels, with each channel controlled by a content programmer responsible for that channel's content. In these systems, viewers do not decide to watch content on a per-video basis, but instead choose a channel and follow the content selection of the channel's content programmer. Advertisements may be sold based on channel viewership, rather than video viewership.

A system is needed that combines favorable aspects of internet content distribution with favorable aspects of traditional cable content distribution, such as a content programmer. This invention presents a network-based system that allows a traditional content programming and distribution model to incorporate internet-based content and advertisements.

U.S. Pat. No. 8,578,408 to Richard W. Tom, et al. teaches a method and apparatus for providing advertisements based on user preferences. According to the method taught by this patent, the steps comprise receiving first data from a user device that identifies a video program to be streamed, transmitting second data to the user device that includes a resource locator for video content and metadata indicating a time to insert an advertisement. The patent fails to teach a system of packaging internet-based content to comport with traditional "channel selection" paradigm of a cable television model over an internet-based distribution system.

Reference is also made to video encoding and decoding techniques, and methods of combining different videos of different formats. Media content may be digitally encoded in many different digital formats. For video-based formats, it is undesirable to stream raw digital video and audio data over the internet because these formats require too much bandwidth, and quality that is imperceptibly different to the human eye from the raw format may be achieved through encoding formats that reduce the bit-rate necessary to transmit the data. For example, digital video data is commonly encoded using a lossy compression encoding format such as H.264/MPEG-4 Advanced Video Coding ("H.264"), H.265, windows media video ("WMV"), and other formats. Similarly, audio digital media data is commonly encoded using a lossy compression encoding format such as Advanced Audio Coding ("AAC"), Audio Data Transport Stream ("ADTS"), MPEG-1 Audio Layer 3 ("MP3"), and others. Lossless encoding formats exist but are less common because they require higher bit rates.

Before video content is distributed, it is wrapped into a package according to a package format. The package format is a metafile format that specifies how encoded data and metadata are stored. For example, there exists the MPEG-4 Part 14 package format ("MP4"), F4V Flash Video package format, Audio Video Interleave, and others. These package formats contain metadata that instruct a client device how to play the encoded digital video and audio data contained therein, and they may also optionally support other metadata, such as subtitles, titles, bookmarks, etc.

These package formats, before transport, are packed according to a transport protocol. Recently, video and audio transport schemes have been developed that are readily adaptable to changing bit rates, so-called dynamic adaptive streaming over hypertext transfer protocol. For example, MPEG dynamic adaptive streaming over HTTP ("MPEG-DASH") breaks a single source content into a sequence of small segments containing a short interval of playback. When a client device plays a segment of content, it also measures the bandwidth of the connection to the server content source. Based on the bandwidth measurement, it instructs the server content source to send the next short content segment encoded at the highest bit-rate corresponding to the available bandwidth. Other similar dynamic adaptive streaming technologies also exist, such as Adobe HTTP dynamic streaming, Apple HTTP live streaming, Microsoft Smooth Streaming, etc. These adaptive streaming technologies may use a variety of different video encoding schemes, such as those mentioned above.

U.S. Pat. No. 8,521,899 to Aashima Narula, et al. teaches that video data encoded, packaged into a package format, and packetized may be re-packaged into a new package format and re-packetized according to determinations of package formats and transport protocols supported by an individual client, without re-encoding video data. Narula does not teach a way to enable a system of delivering internet-based content of different encoding, package, or transport formats to a single client seamlessly with advertisements that may also be a different format and fails to appreciate other aspects of the present invention that will be more apparent by description.

SUMMARY OF THE INVENTION

The present invention provides apparatus, systems, and methods in which user-generated and other internet-based content may be packaged together with advertisements for viewers.

In one aspect of the inventive subject matter, a distributed content system for delivering content is presented. The system comprises a client device including a display and a computing device. The client device is configured to run a content controller and a content player. The content player is configured to play an object defined by the content controller. The content controller is further configured to send a content identifier to a server computing device, which is configured to receive the content identifier and to send data comprising a list of content segments and a content segment length corresponding to a first content segment in the list to the client device in response to the receipt of the content identifier.

The content controller is further configured to set the object of the content player to the first content segment in the list of content segments and determine whether time elapsed since the object of the content player was set to a first content segment is equivalent to or greater than the content segment length, and if the determination is yes, set the object of the content player to a second content segment in the list of content segments. Each content segment in the list of content segments comprises a content resource locator and at least one content segment in the list of content segments corresponds to advertisement content. The content resource locator is used by the client device to retrieve audio/video from a server device. The audio/video retrieved from the server device for one content segment may be in the same format or different format from other audio/video retrieved for other content segments. When the client device receives audio/video from the server device in response to the content resource locator, the audio/video includes metadata comprising format information. The client device decodes the metadata comprising format information and decodes the audio/video according to the format information, thus enabling content of different formats, and from different creators, to be presented to a user seamlessly, initiated only by sending a content identifier to the server computing device.

In another aspect of the inventive subject matter, the first content segment in the list of content segments comprises video data encoded in a first format, and the second content segment in the list of content segments comprises video data encoded in a second format, where the first format and second format are different. In another aspect of the inventive subject matter, the first format corresponds to a first video encoding method, and the second format correspond to a second video encoding method different from the first video encoding method. In another aspect of the inventive subject matter, the first format corresponds to a first video packaging format, and the second format corresponds to a second video packaging format different from the first video packaging format. In still another aspect of the inventive subject matter, the first format corresponds to a first transport protocol and the second format corresponds to a second transport protocol different from the first transport protocol. For example, the first transport protocol may be Apple HTTP live streaming, while the second transport protocol may be MPEG-DASH. As another example, the first transport protocol may include real-time messaging protocol ("RTMP") and the second transport protocol may include MPEG-DASH.

In another aspect of the inventive subject matter, the server computing device is configured to respond to the content identifier with a list of content segments and an episode length, where the episode length corresponds to the run-time length of the content in the list of content segments. In this aspect of the inventive subject matter, the episode length may be 30 minutes, one hour, or other intervals. When the content controller defines an object to be played by the content player and activates the object for playing, the content controller also begins a timer. The content controller determines, based on the episode metadata and the timer, whether the client computing device has reached the end of the list of content segments. If it has, instructions associated with reaching the end of an episode are executed.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Figure 1:
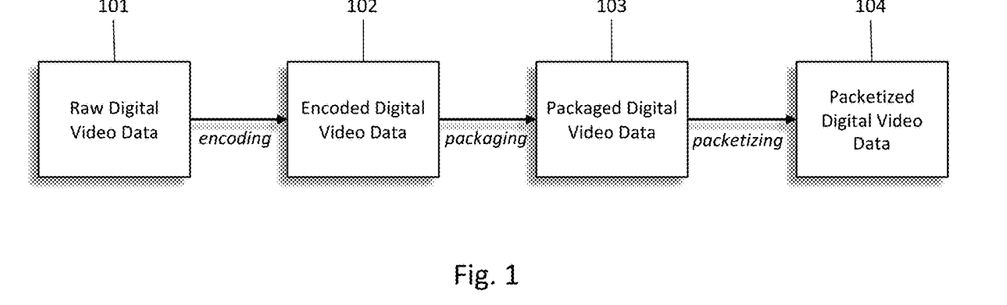
FIG. 1 depicts the digital video data encoding, packaging, and packetizing process.

FIG. 1 depicts a process by which raw video data (audio data not depicted, but may be present in implementations) is packaged into a form suitable for transport over the internet. Raw digital video data 101 is first encoded into encoded digital video data 102, which is then packaged into a package format to create packaged digital video data 103, which is in turn packetized into packetized digital video data 104 having associated packetized digital video metadata. Encoding, packaging, and packetizing may each be performed according to any of the well-known methods such as those described in the background art and may also be performed by new methods not presently known without altering the substance of the invention.

Figure 2:
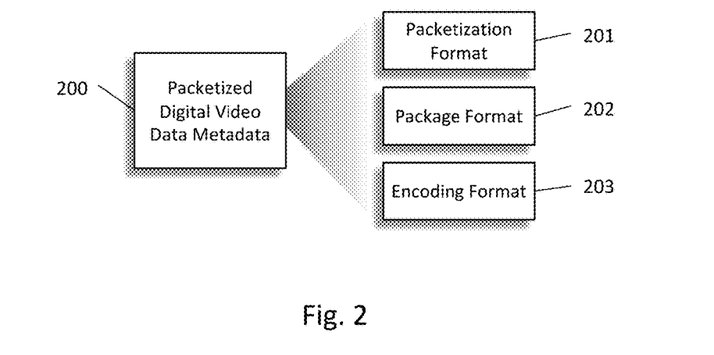
FIG. 2 depicts various data contained in the packetized digital video data.

FIG. 2 depicts various elements of packetized digital video data that assist understanding the present invention. From packetized digital video metadata 200, a client device may determine an associated packetization format 201, package format 202, and encoding format 203.

Figure 3:
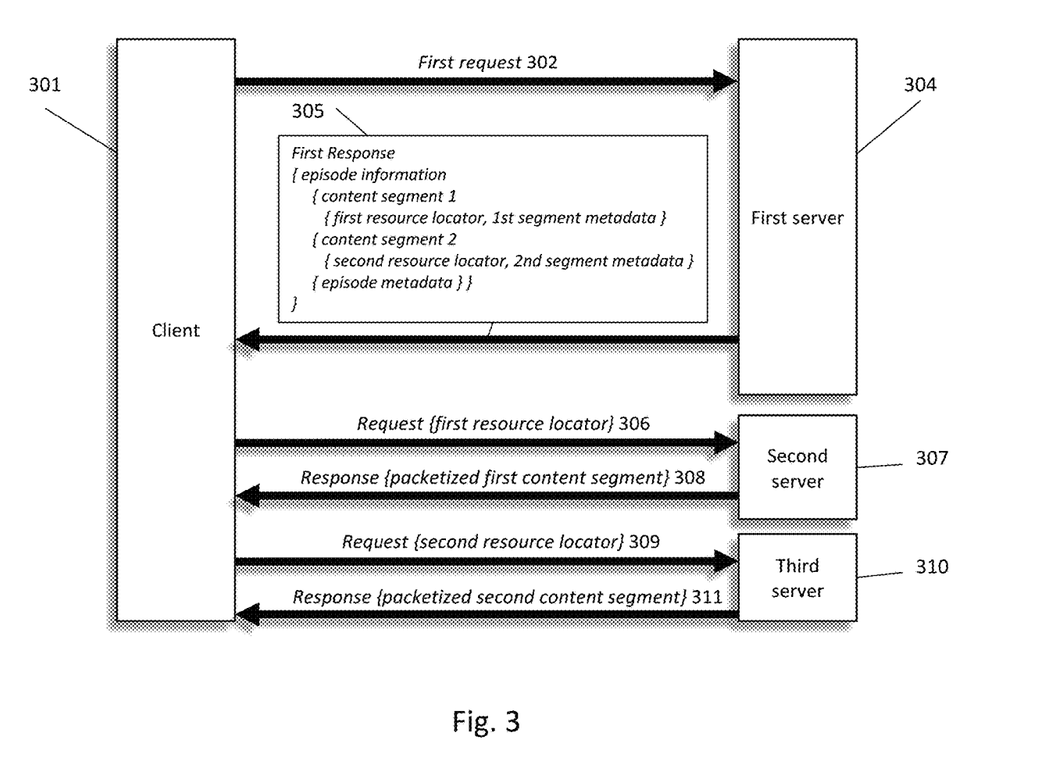
FIG. 3 depicts the process of client/server communication according to the invention.

FIG. 3 depicts a method by which a client computing device 301 retrieves video and associated information from a server according to the present invention. Client computing device 301 sends a first request 302 comprising an episode identifier to a first server 304. First server 304 responds to the first request 302 with a first response 305, which includes episode information according to the episode identifier. Episode information comprises a list of content segments together with episode metadata. According to the invention, the list of content segments may have content segment metadata associated with each content segment in the list. Content segment metadata comprises a selection of one or more of content segment length, format, quality, title, and may also comprise other similar information. Other embodiments are also possible, where content segment metadata is transmitted with episode metadata. Episode metadata comprises an episode length. According to the invention, at least one content segment in the list of content segments corresponds to an advertisement. Content segments are paired according to a process described in more detail below, and additional uses for episode identifiers are also described in more detail below.

At appropriate times after a first response 305 is received from first server 304, such as when a user presses play on an episode or the content controller sets a content segment, as described in greater detail below, client computing device 301 next sends a second request 306 that requests data corresponding to a first resource locator from second server 307. In response, second server 307 delivers a second response 308 comprising packetized first content segment that corresponds to packetized digital video data. In some embodiments, the packetized digital video data of a segment corresponds to a live stream. At another appropriate time, such as when the content controller sets a second content segment according to the process below, client computing device 301 sends a third request 309 comprising second resource locator to third server 310. In response, third server 307 sends a third response 311 that comprises a packetized second content segment. As described in further detail below, the second content segment corresponds to an advertisement.

Figure 4:
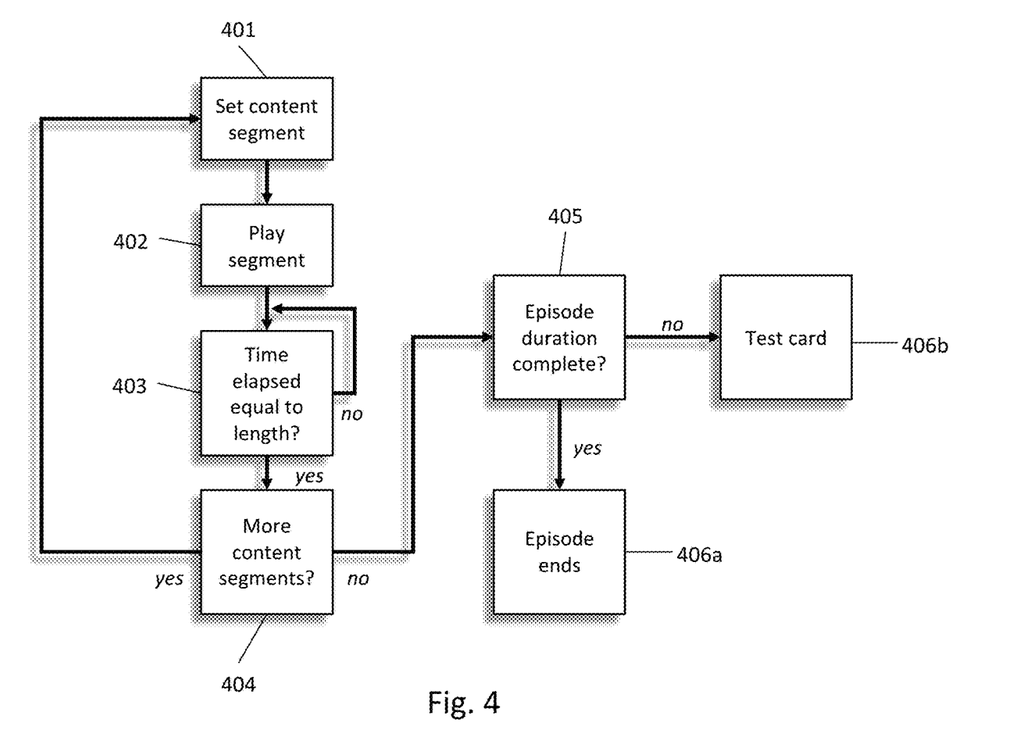
FIG. 4 depicts the client episode playback process according to the invention.

FIG. 4 depicts a process flow chart for a content controller used in playing an episode according to the invention. At step 401, content controller sets the content segment. In one aspect of the invention, in which episodes play in "current time," step 401 also comprises the step of determining a segment that corresponds with the current time. At step 402, the content controller instructs the content player to play the currently set content. In a "current time" aspect of the invention, step 402 also comprises the step of determining an offset of a content segment based on the current time. At step 403, content controller determines whether the time elapsed is equivalent to the content segment length. In "current time" aspects of the invention, step 403 further comprises determining an equivalent time elapsed based on the time elapsed since an episode began playing and an episode offset as determined in step 402. In some aspects of the invention, the content controller may rely on a message from the content player than a content segment has finished playing, thereby triggering the determination of step 402. If the time elapsed is evaluated to be equal to the length in step 403, content controller determines at step 404 whether more content segments exist in the list of content segments. If yes, content controller returns to step 401. If no, content controller progresses to step 405, in which the content controller determines, based on an elapsed time and an episode length from episode metadata received as shown in and described by reference to FIG. 3, whether the episode has finished. If the episode has finished, content controller progresses to step 406a, executing a sequence of instructions associated with an episode ending. If the episode has not finished based on the calculation in step 405, e.g., because a user skipped advertisements associated with the episode, content controller progresses to step 406b and instructs content player execute instructions associated with the end of an episode, depicted in 406b as playing a test card. This sequence also creates an undesirable viewing quality if a viewer attempts to circumvent viewing advertisements.

Figure 5:
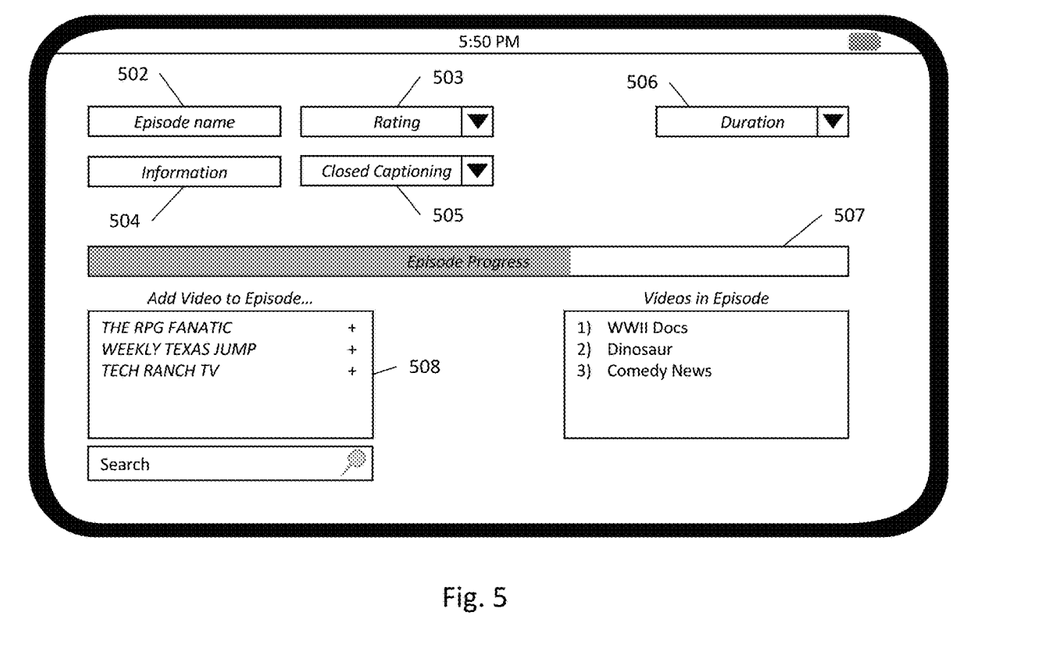
FIG. 5 depicts an aspect of the invention used to create episode segments.
Figure 6:
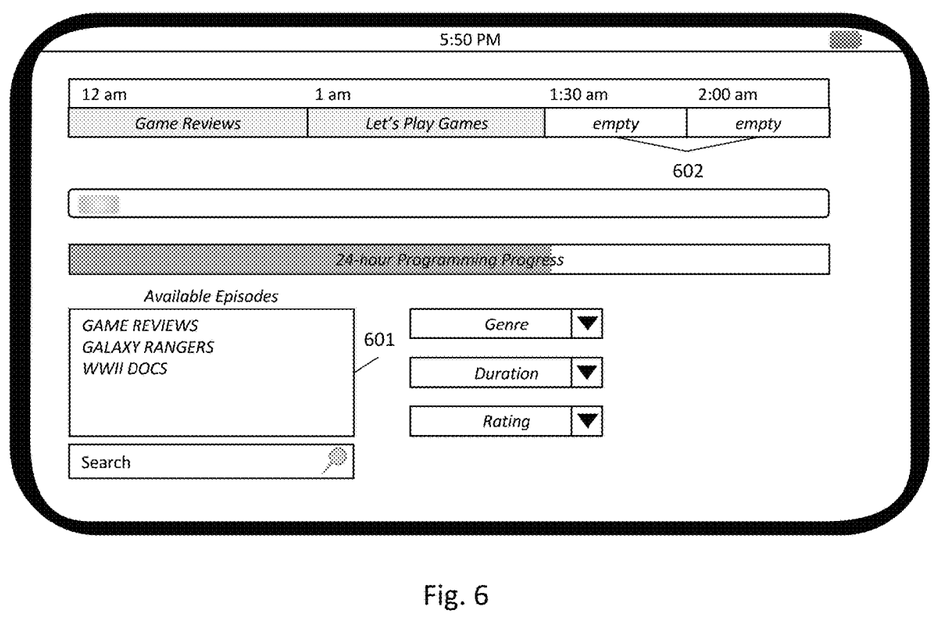
FIG. 6 depicts a channel programming scheme according to the invention.

FIG. 5 and FIG. 6 depict aspects of the invention that represent an important application of the systems and methods described herein. While user-generated content has found ready methods of distribution on the internet, a lack of tools to assist content programmers and means to distribute the creative output of content programmers has held back and creatively constrained online content creators.

FIG. 5 depicts, as running on a mobile computing device, an application for creating video and associated information to be distributed alongside packetized digital video data. According to this aspect of the invention, the application includes an episode name input field 502, episode rating input field 503, episode information field 504, episode closed caption field 505, and episode duration field 506. These fields reflect episode metadata which may be stored and sent alongside packetized digital video data, as described above. Application may include different fields according to different episode metadata. Application also includes episode progress indicator 507, which displays a measure of progress in filling out the duration of an episode with video content, where the duration of an episode corresponds to the episode length to be stored in episode metadata. Video content may be added to an episode from video content window 508. When video content is assembled into an episode according to application 501, the result is the storage of the episode information and episode metadata, which can be sent as first response by the first server, as mentioned above in describing FIG. 3.

FIG. 6 depicts an aspect of the invention for assembling episodes constructed as in FIG. 5 into a 24-hour programming schedule for distribution. A channel programmer selects available episodes 601 and fills them into time slots 602. FIG. 6 also depicts a scroll bar enabling the programmer to scroll through the time slots of a day, and a progress bar indicating progress in completing a 24-hour programming schedule based on episodes provided. Episodes in the resulting schedule may be transmitted according to the process depicted in FIG. 3 and FIG. 4 and described above.

Thus, specific compositions and methods of distributed content distribution have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A distributed content system for delivering content, comprising:
    a client device comprising a display and a computing device;
    wherein the client device is configured to run a content controller and a content player,
    wherein the content player is configured:
        (a) play an object defined by the content controller;
        (b) send a content identifier to a server computing device, the server computing device being configured to receive the content identifier and to send data comprising a list of content segments comprising a first content segment with an associated first context resource locator, a second content segment with an associated second content resource locator, and episode metadata comprising an episode length, wherein the first content segment is a non-advertisement content segment having a first duration and the second content segment is an advertisement content segment having a second duration;
        (c) verify that the first content segment corresponds to a current time;
        (d) define the object to be played by the content player by setting the first content segment as object;
        (e) determine an offset time of the object based on the current time;
        (f) activate the object using the offset time;
        (g) determine an equivalent time elapsed for the episode based on a time elapsed since the episode began playing and the offset time of the object; and
        (h) determine whether the equivalent time elapsed since the object was activated is equivalent to or greater than the first duration, and if the determination is yes, redefine the object to be played by the content player by defining the second content segment as the object;
        (i) determine whether the equivalent elapsed time since the episode began playing is equal to the episode length; and
        (j) cease playback according to determination in step (i) and; (1) if the equivalent elapsed time is less than the episode length and no subsequent content segments exist in the list of content segments, display card, and (2) if the equivalent elapsed time is equal to the episode length, execute end of episode instructions.

2. The system of claim 1, wherein the first content resource locator corresponds to content located on a first server, and a second content resource locator corresponds to content located on a second server, wherein the first and second servers are different.

3. The system of claim 1, wherein the first content resource locator corresponds to content packetized according to a first protocol, and the second content resource locator corresponds to content packetized according to a second protocol, wherein the first and second protocols are different.

4. The system of claim 1, wherein the first content resource locator corresponds to content packaged in a first package format, and the second content resource locator corresponds to content packaged in a second package format, wherein the first and second package formats are different.

5. The system of claim 1, wherein the first content resource locator corresponds to content packetized according to MPEG-DASH protocol.

6. The system of claim 1, wherein the first content resource locator corresponds to content packetized according to real-time messaging protocol (RTMP).

7. A distributed content system for delivering content comprising:
    a client device, configured to communicate with a first server, a second server, and a third server, wherein the client device comprises computer instructions for performing the following:
        sending an episode identifier to the first server;
        receiving, from the first server, a list of content segments and episode metadata, wherein the list of content segments comprises a first content resource locator corresponding to a first content segment and a second content resource locator corresponding to a second content segment, the episode metadata comprises an episode length, and the first content segment is a non-advertisement content segment having a first duration and the second content segment is an advertisement content segment,
        accessing the first content resource locator to request the first content segment from the second server;
        receiving, from the second server, the first content segment comprising first packetized digital video data;
        playing the first content segment on the client device and beginning a first timer near when the first content segment begins playing, wherein the first timer is configured to count up a first elapsed time;
        upon the elapsed time being equal to a first length of the first segment, completing playback of the first content segment and accessing the second content resource locator to request the second content segment from the third server;
        receiving, from the third server, the second content segment comprising second packetized digital video data;
        playing the second content segment on the client device and beginning a second timer near when the second content segment begins playing, wherein the second timer is configured to count up a second elapsed time;
        determining whether any unplayed content segments remain available for playback;

upon determining that no unplayed content segments from the list of content segments remain available for playback, determining, based on at least one of the first elapsed time, the second elapsed time, and the episode length, that the episode has ended; and displaying a test card upon determining that an episode has ended and a total elapsed time, which is a sum of at least the first and second elapsed times, is less than the episode length.

8. The system of claim 7, wherein the first packetized digital video data is packetized according to a first protocol and the second packetized digital video data is packetized according to a second protocol, and the first and second protocols are different, and wherein the client device is further configured to play the second packetized digital video data immediately following completion of playing the first packetized digital video data.

9. The system of claim 7, wherein the second server and the third server are different.

10. The system of claim 9, wherein the first server, second server, and third server are different.

11. The system of claim 9, wherein the first packetized digital video data is packaged according to a first packaging format and the second packetized digital video data is packaged according to a second packaging format, and the first and second packaging formats are different, and wherein the client device is further configured to play the second packetized digital video data immediately following completion of playing the first packetized digital video data.

12. The system of claim 9, wherein the first packetized digital video data is encoded according to a first encoding format and the second packetized digital video data is encoded according to a second encoding format, and the first and second encoding formats are different.

13. The system of claim 7, wherein the first packetized digital video data corresponds to a live stream.

\* \* \* \* \*